E. RIMAILHO.
TRANSMISSION MECHANISM FOR AUTOMOBILE VEHICLES HAVING WHEELS AND ENDLESS TRUCKS.
APPLICATION FILED NOV. 22, 1919.
1,360,022.
Patented Nov. 23, 1920.
2 SHEETS—SHEET 1.
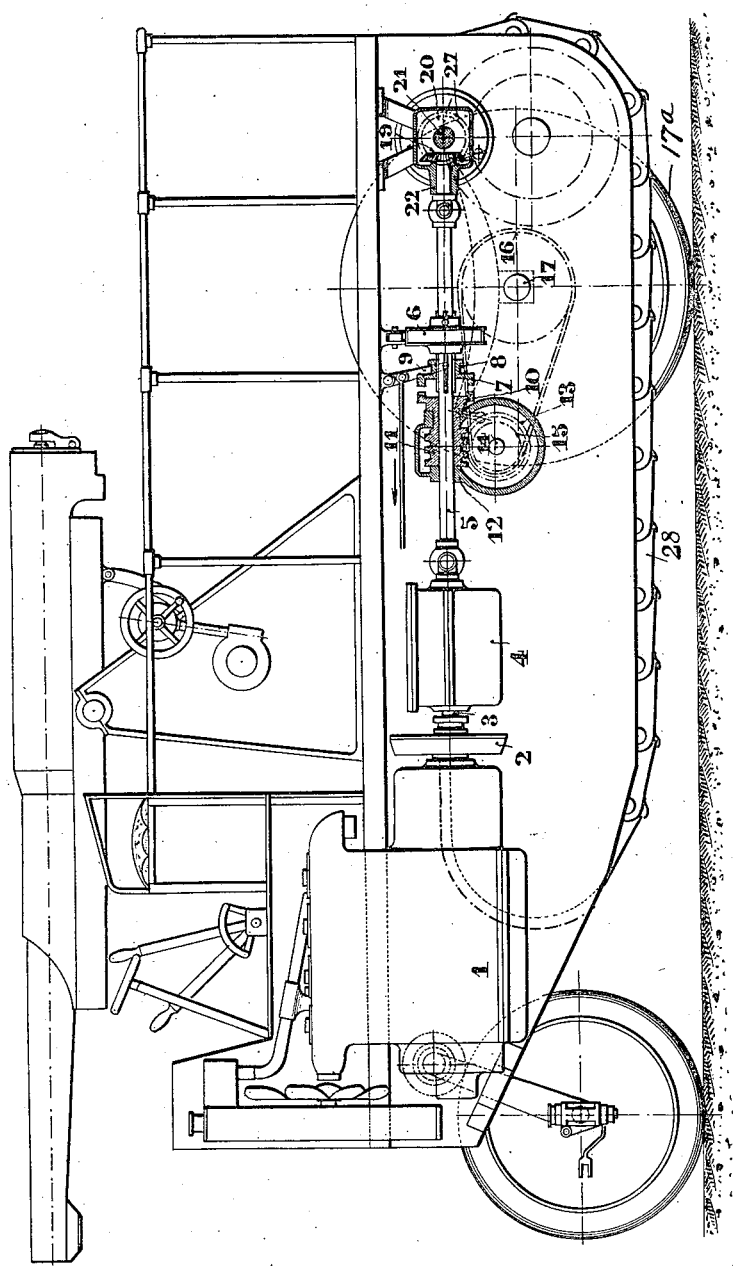
INVENTOR
Emile Rimailho.
BY
ATTORNEYS

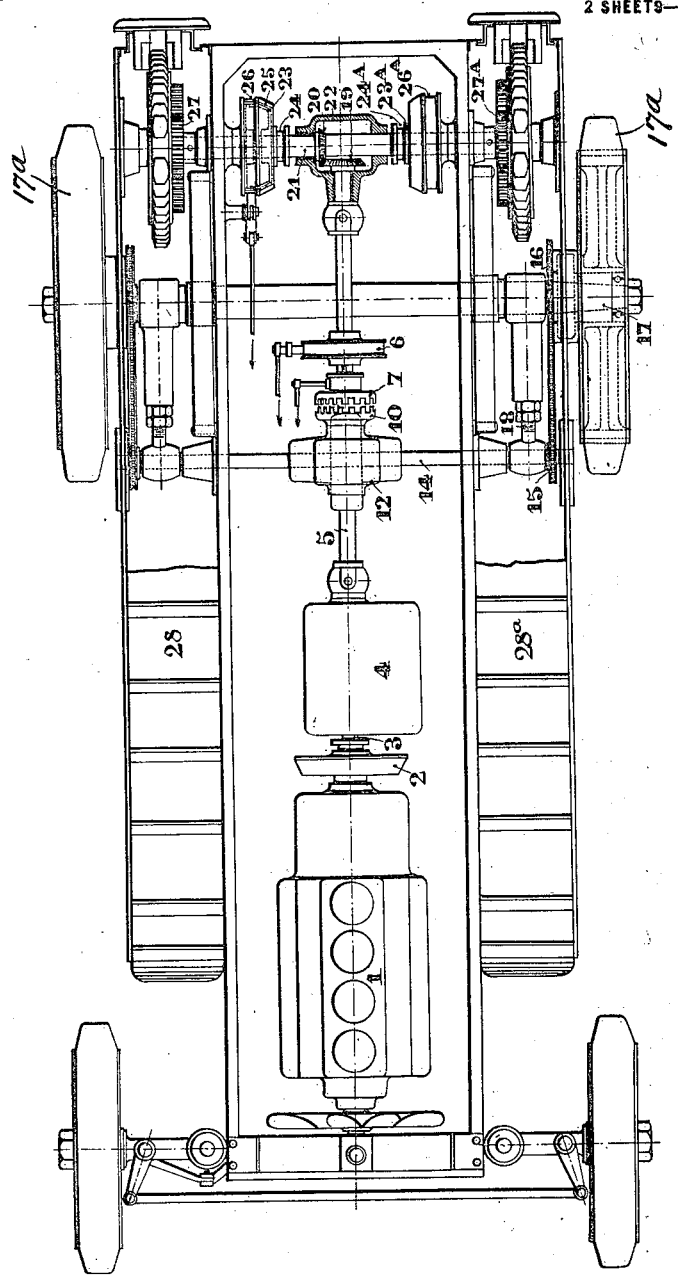

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

TRANSMISSION MECHANISM FOR AUTOMOBILE VEHICLES HAVING WHEELS AND ENDLESS TRUCKS.

1,360,022.

Specification of Letters Patent.   Patented Nov. 23, 1920.

Application filed November 22, 1919. Serial No. 339,902.

*To all whom it may concern:*

Be it known that I, EMILE RIMAILHO, a citizen of the French Republic, and residing in Paris, France, 12 Rue de la Rochefoucauld, have invented certain new and useful Improvements in and Relating to Improved Transmission Mechanism for Automobile Vehicles Having Wheels and Endless Trucks, of which the following is a complete specification.

This invention has for its object a transmission mechanism which permits of obtaining in an automobile vehicle an alternation from the progression by wheels to the progression by endless tracks or vice-versa. A device of this nature is particularly useful in vehicles employed in transporting of artillery or for agricultural purposes where it is necessary sometimes to travel by road, or across fields or over very rough and uneven ground. The system hitherto employed to this end offer a complexity of construction such that in practice they rapidly become useless. The construction of a simple and strong device comprising separately all the parts which permit of rapid change from one to the other mode of progression either by wheels or by endless tracks, has not hitherto been achieved.

The present invention embodies on the one hand a mechanism suitable for progression by wheels, and on the other hand a mechanism equally suitable for progression by endless tracks, the two mechanisms being operated from one and the same power source.

The accompanying drawings represent by way of example a constructional form of the invention applied to a transport of artillery material:

Figure 1 is a longitudinal elevation.

Fig. 2 is a plan.

In Fig. 1, 1 represents the usual motor, 2 the clutch, 3 the motor shaft, 4 the change speed gear, 5 the driving shaft, on which is keyed the brake 6, the whole being the ordinary arrangement of a motor vehicle.

To carry out the invention there is keyed on the driving shaft 5 a coupling or clutch sleeve 7 sliding on the shaft 5 and provided with a groove 8 in which engages an operating lever 9. Opposite this sleeve is situated the counter coupling or clutch sleeve 10 attached to an endless screw 11 and mounted loose on the driving shaft 5, within the gear casing 12. The endless screw 11 is engaged with a helicoidal wheel 13 below the screw and forming the driving ring of the differential, the said wheel 13 being mounted on the transverse shaft 14 carrying at its ends pinions and over which pass chains 15 which drive pinions 16 mounted on the axle 17 of the wheels 17$^a$. The working of the chains is assured as in every vehicle, by a chain tightener 18. The driving shaft 5 carries at its end remote from the motor, a pinion 19 which engages with a pinion 20 mounted on a transverse shaft 21 mounted in a casing 22, and which carries the female cones 23 and 23$^a$ and the male cones 25 of the clutches. To the female cones 23 and 23$^a$ are secured grooved collars 24 and 24$^a$ to be engaged by operating forks for engaging and disengaging the said cones. The male cones 25 carry the brake drums 26 and 26$^a$ and are connected to trains of gears 27 and 27$^a$ which operate the endless tracks.

The action is as follows:

When the vehicle travels on wheels 17$^a$, the sleeve 7 is coupled to its counter sleeve 10 and transmission is effected to the motor axle by the aid of the endless screw 11, helicoidal wheel 13, pinion 15 and finally from thence to the pinion 16 of the wheels 17$^a$. In this position, all the transmission comprising the motor shaft, the driving shaft working the brake drum, 6, the pinions 19 and 20 and also the female cones 23 and 23$^a$ participate in the rotary movement and in this position the transmission to the wheels is an ordinary automobile transmission.

When it is desired to change over to progression by endless tracks, the coupling or clutch sleeve 7 is disconnected and the cones 23 and 23$^a$ are moved into engagement with the male cones 25, which sets in action the system of gear trains 27, 27$^a$ and consequently the endless tracks 28, 28$^a$.

It must be quite understood that in order to carry out the invention any system whatever of transmission to the driving wheels and transmission wheels for the endless tracks may be used, also that any system whatever of clutching one to the other and of clutching in the driving gears for the endless tracks may be used.

The pinions 19 and 20 may obviously be replaced by any suitable means for example by sleeve and counter sleeve. In like manner the male and female cones 23 and 25 may be replaced by any other suitable clutch coupling device.

What I claim is—

1. In a motor vehicle having driving wheels and endless tracks, a driving shaft, a worm loose on said shaft, means for connecting and disconnecting the worm with the shaft, a transverse shaft having a gear wheel meshing with the worm, means for operating the driving wheels from the transverse shaft, a second transverse shaft in rear of the first transverse shaft and geared with the rear end of the driving shaft, gearing between the second transverse shaft and each of the endless tracks, and means for rendering each gearing inoperative.

2. In a motor vehicle having driving wheels and endless tracks, a motor shaft, a driving shaft connected with the motor shaft, a worm loose on the driving shaft, a transverse shaft, a differential on the transverse shaft and including a helicoidal wheel meshing with the worm, means for operating the axle of the driving wheels from the ends of the transverse shaft, a clutch on the driving shaft for connecting the worm with said shaft, a second transverse shaft, a pinion on said second transverse shaft, a pinion on the driving shaft in rear of the first transverse shaft and meshing with the pinion of the second transverse shaft, means for operating each endless track from the second transverse shaft, and clutches on the second transverse shaft, one for each endless track.

3. In a motor vehicle, a frame, front and rear wheels, an endless track at each side of the frame, a motor, a driving shaft operated by the motor, a worm loose on the driving shaft, a transverse shaft, means for operating the rear wheels from the transverse shaft, a differential on the transverse shaft and including a helicoidal wheel meshing with the worm, a clutch on the driving shaft for connecting the worm with said shaft, a pinion on the rear end of the driving shaft, a second transverse shaft at the rear of the frame, a pinion on said second transverse shaft and meshing with the pinion of the driving shaft, a train of gearing for operating each endless track from the second transverse shaft, and clutches on the second transverse shaft, one for each train of gearing.

In testimony whereof I have hereunto set my hand at Paris, France, this 24th day of October, 1919.

EMILE RIMAILHO.

In the presence of a witness:
CHARLES P. PRESSLY.